United States Patent [19]

Gwaltney et al.

[11] 4,456,038
[45] Jun. 26, 1984

[54] APPARATUS FOR PRESSURIZING TIRES TO A DESIRED LEVEL

[75] Inventors: Robert E. Gwaltney, Brentwood; Jim L. Holladay, Nashville, both of Tenn.

[73] Assignee: Hennessy Industries, Inc., La Vergne, Tenn.

[21] Appl. No.: 247,609

[22] Filed: Mar. 25, 1981

[51] Int. Cl.³ .................... B60C 23/00; B60C 29/00; B65B 31/00
[52] U.S. Cl. .................... 141/95; 137/102; 137/224; 137/487.5; 137/624.11; 152/415; 340/58; 340/626; 364/510
[58] Field of Search .................. 152/415; 141/38, 65, 141/66, 95, 198, 192; 137/224, 102, 487.5, 624.11; 73/146.2, 146.5, 714; 340/58, 626; 364/509, 510

[56] References Cited

U.S. PATENT DOCUMENTS

| 4,241,750 | 12/1980 | Furuse et al. | 137/102 X |
| 4,253,480 | 3/1981 | Kessel et al. | 137/102 |
| 4,333,491 | 6/1982 | Knubley | 137/224 X |

FOREIGN PATENT DOCUMENTS 0019463 11/1980 European Pat. Off. .

Primary Examiner—William A. Powell
Assistant Examiner—Thomas Bokan
Attorney, Agent, or Firm—Wood, Dalton, Phillips, Mason & Rowe

[57] ABSTRACT

Apparatus for rapidly achieving a desired pressure level in a tire by gas flow through a port in the tire such as the valve stem including a conduit having one end for connection to a source of gas under pressure and another end for connection to the inflation port. Valves are utilized for selectively closing and opening the conduit and for venting the conduit to the atmosphere. A selector whereby a desired pressure level to be achieved within the tire is provided as is a pressure level sensor which is connected to the conduit. A control in the form of a microprocessor digitally operates the valves to thereby provide for rapid inflation of the tire inasmuch as substantially full source pressure is applied to the tire to thereby provide a high pressure differential and increased gas flow.

6 Claims, 6 Drawing Figures

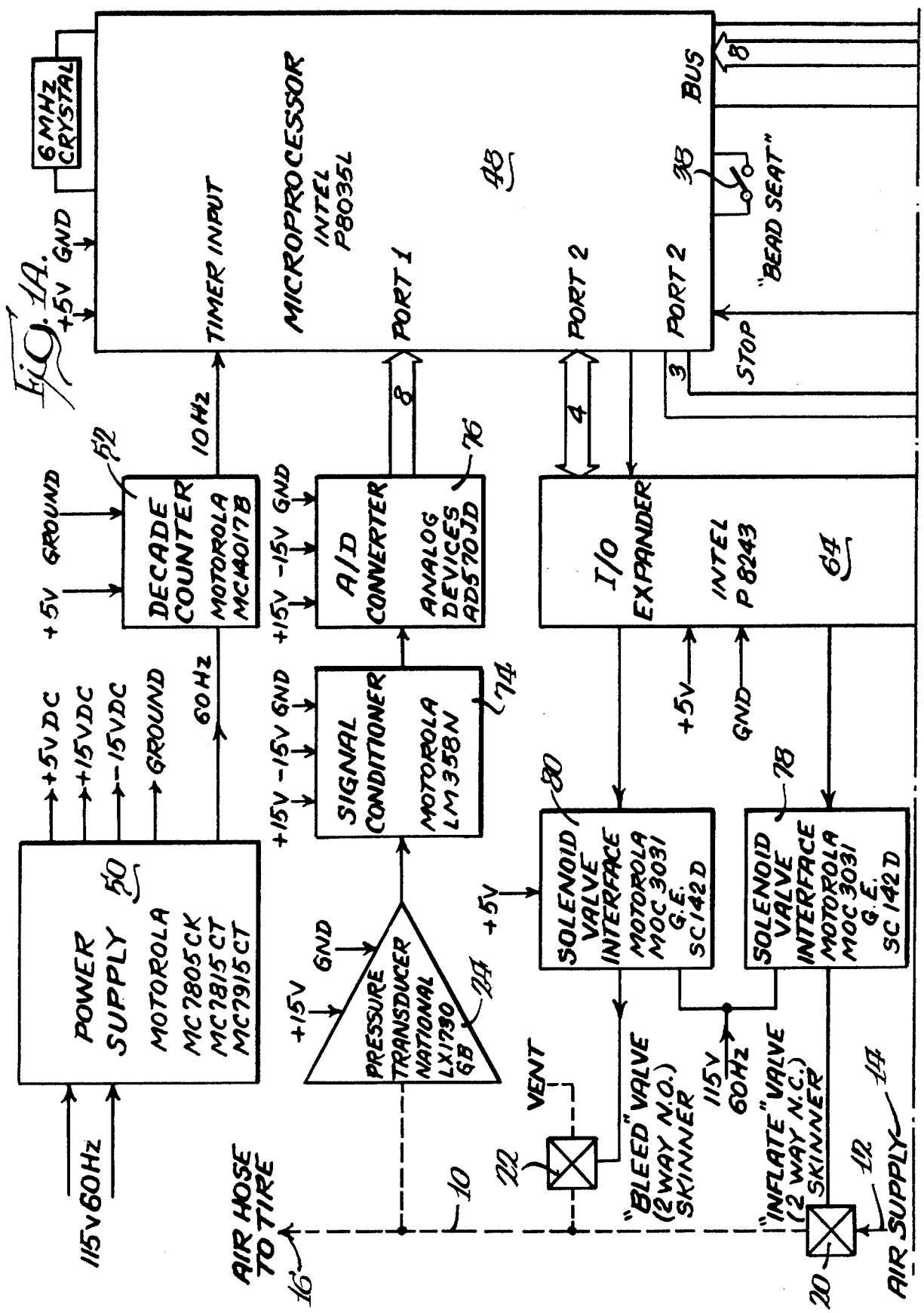

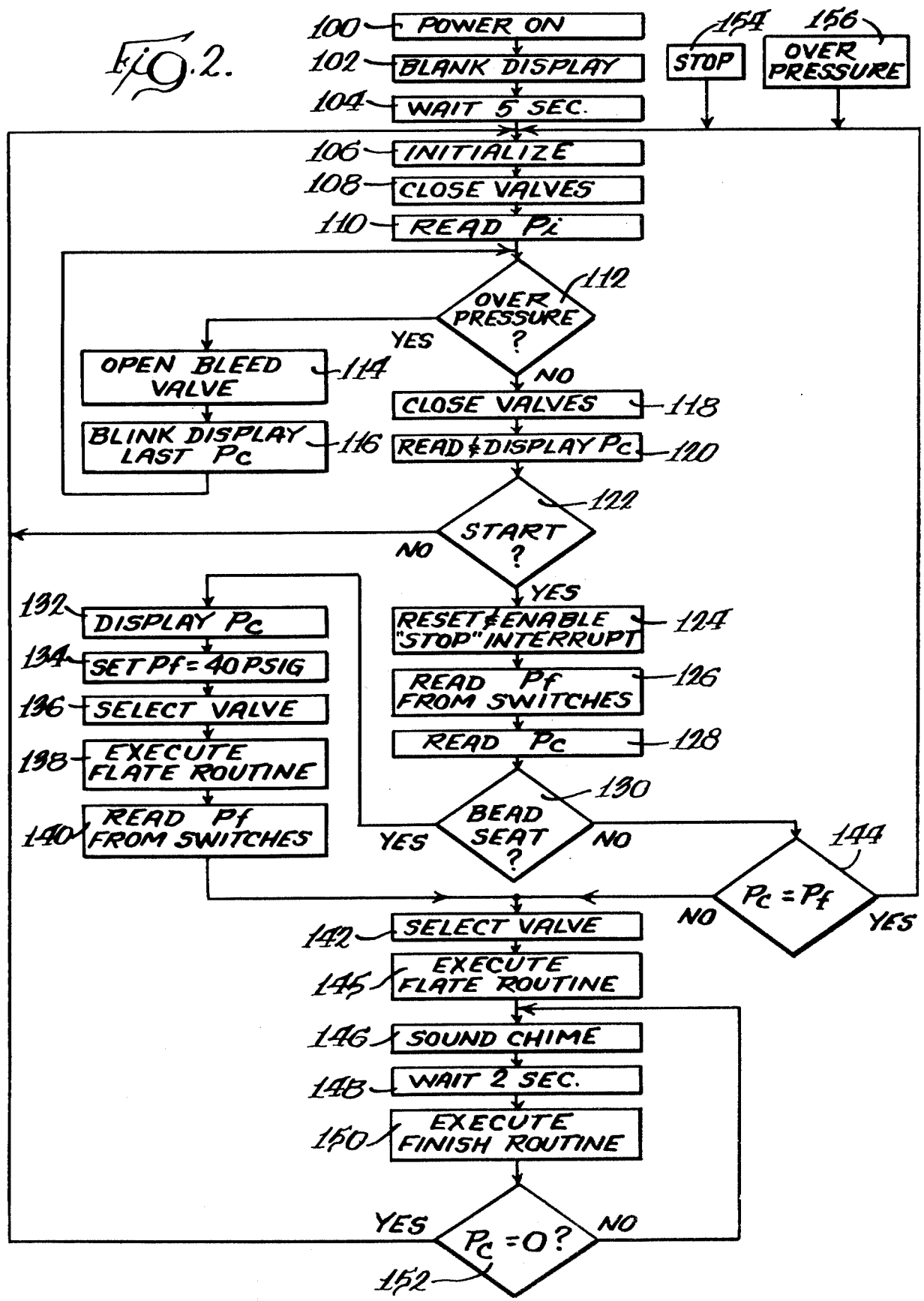

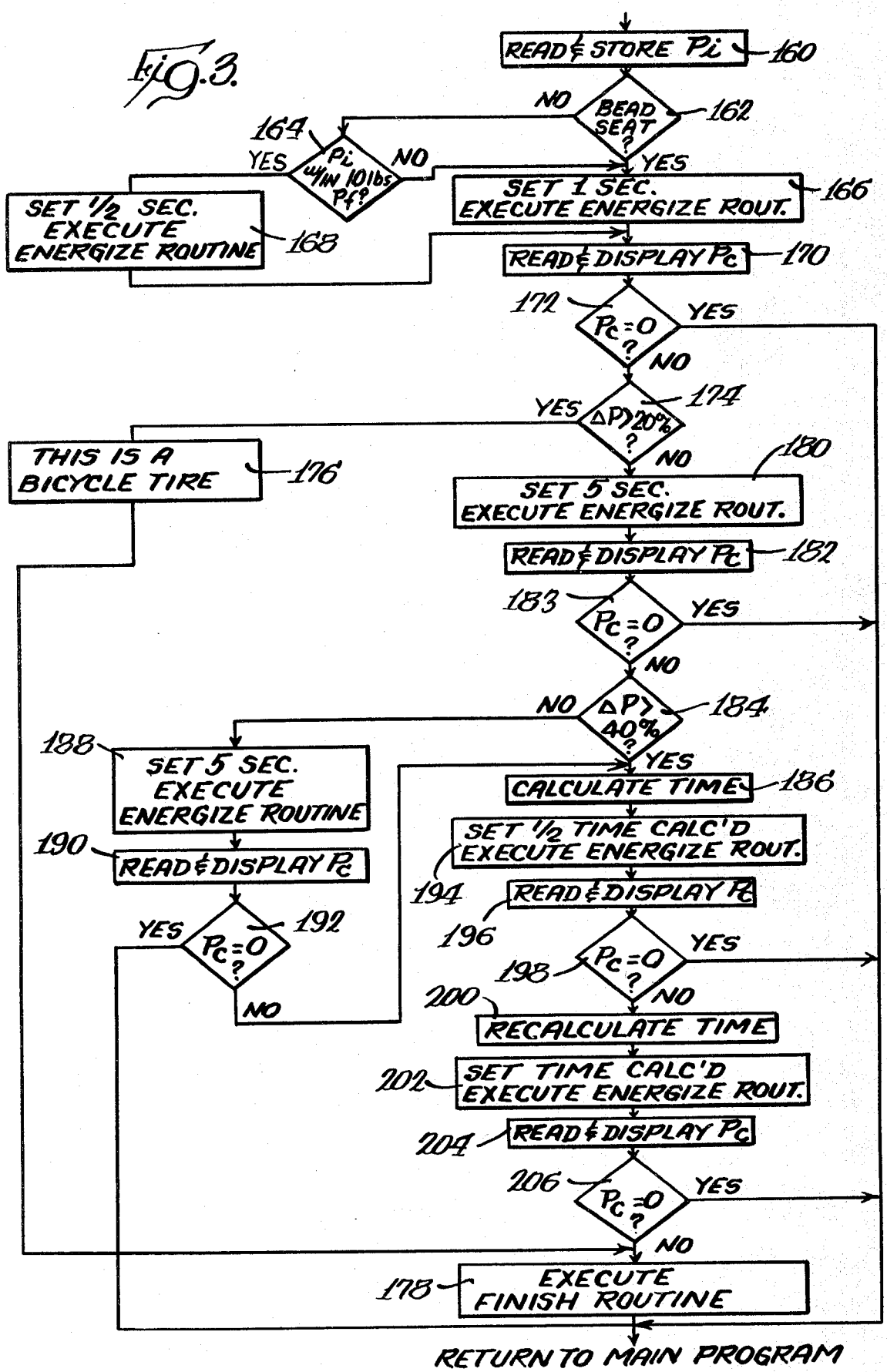

APPARATUS FOR PRESSURIZING TIRES TO A DESIRED LEVEL

FIELD OF THE INVENTION

This invention relates to pressurizing tires to desired pressure levels, and more particularly, to an apparatus for automatically, rapidly inflating and/or deflating a tire to a desired pressure level.

BACKGROUND ART

It has long been known that the life of vehicle tires is prolonged when they are pressurized to desired levels which depend upon the type of tire involved, and that use of such tires will be more trouble free when the proper pressure level is maintained. Discounting methods of achieving desired pressure levels in tires used in automotive assembly lines, there are generally two methods employed in controlling the pressure level within a tire.

One such method is substantially wholly manual. It involves the placing of a pressure gauge in fluid communication with the interior of the tire, generally through the valve stem, and obtaining an indication of the pressure level within the tire. Pressure is then released or added as required either by bleeding excess pressure out of the tire or opening a valve connected to a source of gas under pressure to pass pressurized gas to the interior of the tire. At points in the process, it is necessary to halt gas flow to or from the tire and obtain a pressure reading to determine whether the pressure level desired has been achieved. Not infrequently, the several steps of this process must be repeated a number of times and at the conclusion of an inflation cycle, it may be necessary to bleed off excess pressure since the tire was overpressurized during inflation. The converse may occur during a deflation cycle as well where too much pressure is bled off.

Attempts have been made to automate this process as far as inflation is concerned. In the usual case, the pressurized gas line from a source of gas under pressure is provided with an adjustable pressure regulator and then connected to the interior of the tire, usually by the tire valve stem. A desired pressure level is set on the adjustable pressure regulator and gas will flow from the source to the pressure regulator, be regulated down to the desired pressure set thereon and then flow into the tire until equilibrium is achieved.

While the ultimate result of such system, namely, the achieving of a desired pressure level in the tire, is satisfactorily obtained, such systems have not achieved wide acceptance because of the slowness of operation thereof. In particular, because the pressure of the gas flowing out of the pressure regulator is equal to the desired pressure level to be achieved in the tire, as the desired pressure level in the tire is being reached, the pressure differential required to cause gas flow into the tire becomes progressively smaller. Thus, the flow rate of gas is constantly being reduced and becomes a mere trickle as the desired pressure level is approached. Such systems require so much time to inflate a tire to the desired pressure level that the manual method mentioned previously is employed in the vast majority of cases simply because it is more rapid even though more prone to under or over inflation errors because of the human element involved.

Furthermore, where such systems are employed where a considerable range of tire pressures are to be achieved, additional difficulties attend their use. Specifically, under and/or over inflation errors are not uncommon and difficulty is experienced in accurately achieving the pressure regulator from one pressure to another. This difficulty can be overcome by calibrating the system each time a pressure change is to be made, but recalibration is time consuming thereby further delaying an inflation process.

SUMMARY OF THE INVENTION

It is the principal object of the invention to provide a new and improved apparatus for rapidly achieving a desired pressure level in a tire by gas flow through a port in the tire. More specifically, it is an object of the invention to provide such a tire pressurizing control system wherein a desired pressure level in a tire is achieved substantially automatically and with no human intervention other than the connection of a tire to the system and the choosing of the desired pressurization level. It is likewise an object of the invention to provide such a system wherein the accuracy of attaining a desired pressure level is vastly increased over substantially manual methods heretofore used and in which the desired pressure level is achieved more rapidly than by the manual methods heretofore used or those automated methods heretofore used and identified above.

An exemplary embodiment of the invention achieves the foregoing objects in an apparatus including a conduit having one end for connection to a source of gas under pressure and another end for connection to a port on the tire. Valve means are provided for opening and closing the conduit. Means are provided for selecting a desired pressure level to be placed in the tire and pressure level sensing means are connected to the conduit. A control means is responsive to the sensing means and to the selecting means for digitally operating the valve means to apply gas under pressure substantially at the pressure level of the source to the tire port throughout an inflation cycle. The invention therefore maintains a high pressure differential throughout the inflation cycle to minimize the length thereof.

The invention also contemplates that the valve means include means for venting the conduit to the atmosphere, which valve means are operated by the control means so as to automatically reduce the pressure level of an overinflated tire to a desired pressure level when the system is employed.

A highly preferred embodiment of the invention includes means for distinguishing between small volume tires such as bicycle tires and larger tires to make the system adaptable to virtually any size tire in use.

The invention contemplates that the control means also be operable in a mode to provide a pressure readout, and thereby act solely as a pressure gauge, when that is desired.

Other objects and advantages of the invention will become apparent from the following specification taken in connection with the accompanying drawings.

DESCRIPTION OF THE DRAWINGS

FIG. 2 is a flow chart of a main program utilized in the control means of the invention;

FIG. 3 is a flow chart of a "flate" sub-routine of the program;

DESCRIPTION OF THE PREFFERED EMBODIMENT

Figure 1B:
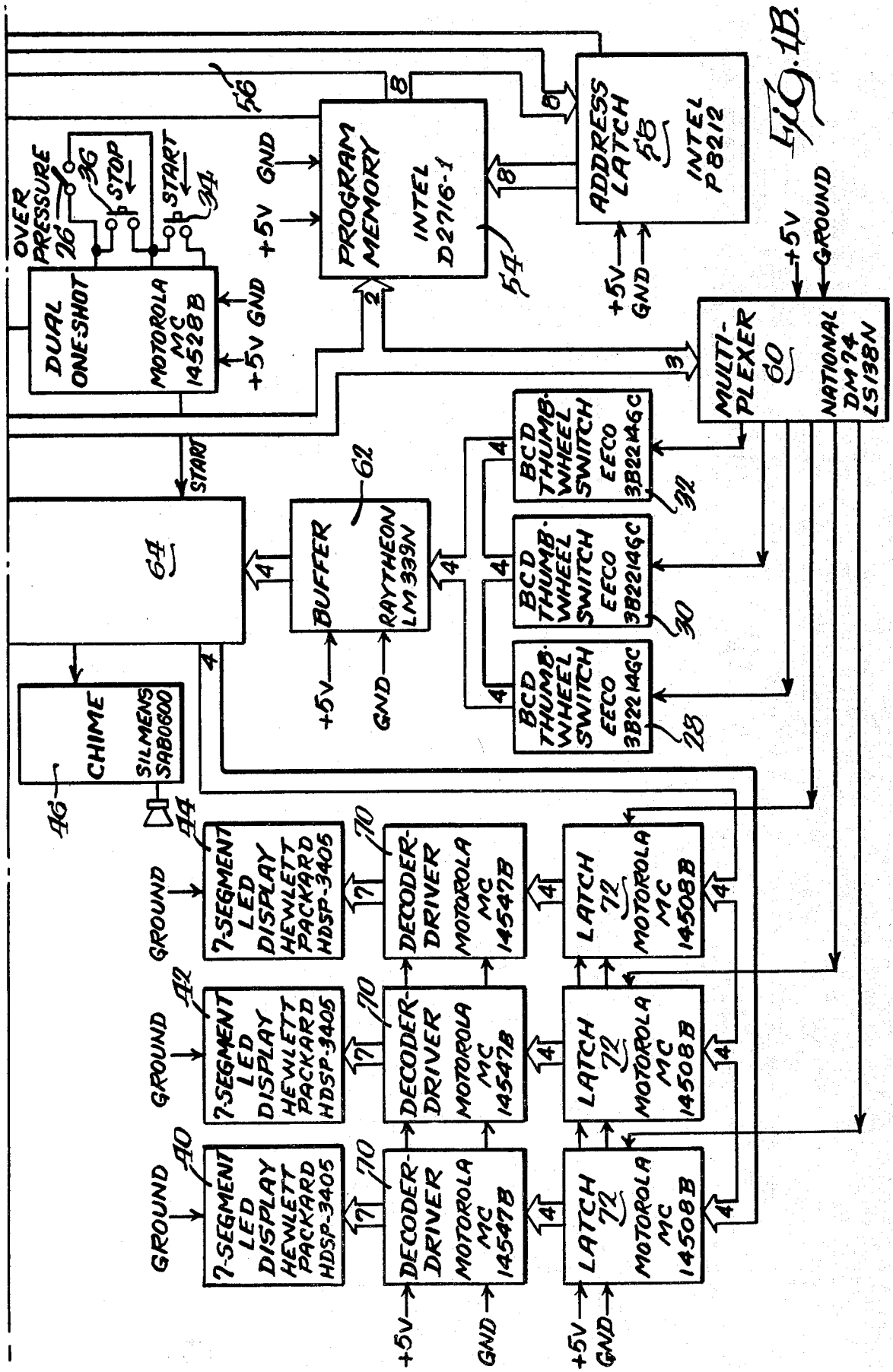
FIG. 1 is a block diagram of one embodiment of the invention and is comprised of FIG. 1A and FIG. 1B.
FIG. 1A being placed to the top of FIG. 1B.

An exemplary embodiment of a tire pressurization control system made according to the invention whereby a desired pressure level may be achieved in a tire is illustrated in the drawings and in order to facilitate an understanding of the description thereof that follows, it is desirable that certain terms employed hereinafter be defined.

$P_i$ is initial pressure, that is, the pressure level in the tire immediately after the system is connected to the tire, usually by the valve stem, and before an inflation or deflation process is initiated.

$P_c$ is the current pressure, that is, the pressure level in the tire at the time it is sensed during an inflation or deflation process.

$P_f$ is the desired final pressure, that is, the desired pressure level to be present in the tire when an inflation or deflation process is concluded.

$P_l$ is the "line" pressure, that is, a pressure level substantially equal to the pressure of a source of gas under pressure less whatever flow losses may occur during the flow of the gas from the source to the point of measurement.

$P_r$ is a reference pressure slightly less than line pressure and which may be somewhat arbitrarily chosen. In the exemplary embodiment, $P_r$ is chosen to equal 31/32 $P_l$.

$\Delta P$ is the change in pressure from the initial pressure at any point in the inflation or deflation process, that is, $P_c - P_i$.

The percentage of inflation is determined by solving the following expression: $\% = 100\Delta P/(P_f - P_i)$.

It should also be observed that operation of the system is in part based on the observation that at some point in an operational cycle wherein gas under pressure is flowing into or out of the tire, the rate of pressure change versus time is substantially linear for substantially all sizes of tires other than very small tires. While this point may vary somewhat dependent upon the tire, it has been empirically determined that substantial linearity will be achieved for most tires when the actual pressure change exceeds 40% of the desired pressure change. Consequently, it is possible to calculate the remaining time for airflow utilizing the following expression:

$$\text{Remaining time} = 0.9 \text{ (Time elapsed)} \frac{P_f - P_c}{P_c - P_i} \quad \text{Eqn 1}$$

As will be seen, this relationship is modified somewhat during a deflation process in an apparatus made according to the preferred embodiment.

Turning now to FIGS. 1A and B, the exemplary embodiment includes a conduit shown schematically at 10. One end 12 is adapted to be connected to a source of gas under pressure such as an air compressor shown schematically at 14. The other end 16 is adapted to be connected to the fill port on a tire, as for example, a typical valve stem. To this end, the conduit end 16 will typically be provided with a so-called air chuck by which the conduit 10 may be affixed to the tire in fluid communication with the interior therewith.

Between the conduit ends 12 and 16 there is located a normally closed valve 20. When the valve 20 is closed, of course, air cannot flow from the source 14 to the tire while the converse will be true when the valve 20 is opened as will be seen. It is preferred to use a normally closed valve as the valve 20 for the reason that in the event of a malfunction in the system, the valve 20 will revert to its normally closed condition to prevent overinflation of any tire connected to the conduit end 16.

A second valve 22 is in fluid communication with the conduit 10 downstream of the valve 20. The valve 22 is a normally open bleed valve for venting the conduit 10 to atmosphere to relieve pressure from the interior of a tire when it is in excess of the desired level. A normally opened valve is preferred, again for the reason that if there is a system malfunction, it will revert to an open condition to allow an overinflated tire to deflate.

A pressure transducer 24 is in fluid communication with the interior of the conduit 10 between the valve 22 and the end 16 so as to sense the pressure level within the conduit at that point. The transducer 24 provides an electrical output signal whose magnitude is proportional to the pressure sensed.

Finally, there is connected to the interior of the conduit 10, a normally open overpressure switch 26 (shown at the lower righthand corner of FIG. 1A). The purpose of the switch 26 will be described hereinafter. At present it is sufficient to note that when some particular pressure level regarded as an undesirably high level exists within the conduit 10, the switch 26 will close in response thereto to alter the operational sequence of the system.

An information input into the system includes three thumbwheel switches 28, 30 and 32 on which the operator manually sets the hundreds, tens, and units of the desired pressure level to be placed in a tire. Other manual inputs include a normally open start switch 34 by which an operational sequence is initiated, and a normally open stop switch 36 by which the system may be deenergized. A final manual input may be provided on a switch 38. The switch 38 is utilized when the system is to be put into a so-called "bead-seat" mode. As is well known, when tubeless tires have just been mounted on a wheel, the tire beads will not be in abutment with the rim flanges of the wheel, but are forced to that location by elevated pressure within the tire. In the typical case, a pressure level of 40 psig within the interior of the tire will be sufficient to cause the beads to fully seat, that is, move into abutment with the rim flanges of the wheel. The bead seat switch 38 is utilized when such bead seating is necessary.

In terms of output functions, the system includes three light emitting diode displays 40, 42, and 44 which indicate the hundreds, tens and units of system pressures at times monitored as will be seen. A second output is an audible chime 46 to provide a signal that an operational process performed by the system is complete.

Control of inflation or deflation by the system including control of the valves, the provision of outputs, and the utilization of the inputs is attained through the use of a microprocessor 48. The system is powered by a power supply 50 outputed through a decade counter 52 to the microprocessor 48. The decade counter 52 converts the output frequency of the power supply to a suitable time base for use by the microprocessor. Programming instructions for the microprocessor, to be described hereinafter, are contained in a program memory or ROM 54. A data and address bus 56 communicates with the ROM 54 and utilizes an address latch 58 by which the address in the ROM is latched so that data may be subsequently transferred.

Input information from the thumbwheel switches 28, 30 and 32 and output information for the LED displays 40–44 and the microprocessor 48 is controlled by a multiplexing unit 60. The thumbwheel switches 28–32 are also buffered at 62 into an I/O expander 64 connected to the microprocessor. The I/O expander 64 is utilized to enlarge the total number of system ports available to receive or transmit information due to the limited number of ports in the particular microprocessing unit utilized. Customary components such as decoder drivers 70 and latches 72 are utilized in connection with the LED displays 40–44 and the I/O expander while a signal conditioner 74 and an analogue to digital converter 76 are employed in connection with the transducer 24 and the microprocessor 48 to provide sensed pressure information to the latter in digital, as opposed to analogue, form.

Finally, the valves 20 and 22 are operated by outputs received from the I/O expander 64 via suitable driving circuits 78 and 80, respectively.

The vast majority of the components previously described are commercially available items interconnected as is shown. Where applicable, in the drawing, each such element is designated by the name of the manufacturer and the model number of the involved component.

Before initiating a detailed discussion of the flow diagrams illustrated in FIGS. 2–5 inclusive, a short discussion about the general mode of operation of the system is believed in order. During an inflation cycle, the valve 20 is open for predetermined periods of time, some fixed by the program, and others variable depending upon operational parameters existing in the system, to allow air from the source to flow to the interior of the tire. It will be observed that when such occurs, the application of air to the tire will be substantially at the pressure of the source. In the typical case, source pressure will be on the order of 150 psig while, in the case of a typical automobile tire, the desired pressure level will be on the order of 30 psig. Consequently, a large pressure differential will exist throughout the operational cycle and air flow will be rapid enabling rapid inflation of the tire to the desired level. In some cases, the tire may be over-inflated and in such an event, upon connection of the system thereto and operation of the system, the valve 22 will be opened as required to bleed off the excess pressure to the desired pressure level. The operation of the valve 22 will be automatic as determined by the system program and operational parameters.

As mentioned previously, a special mode for bead seating exists. In this mode, internal pressure within the tire is increased to 40 psig to seat the beads and then, assuming a lower desired pressure level, bled off to the desired pressure level.

Very small tires such as bicycle tires represent a special case and the system includes a particular sequence which senses whether a small tire is involved and alters system operation appropriately. Finally, the LED displays 40–44 may be utilized to provide a simple pressure indication thereby acting as a digital pressure gauge without accompanying inflation or deflation when desired.

With the foregoing in mind, the operational program and the various sub-routines utilized will be described in detail.

Referring to the main program flow diagram illustrated in FIG. 2, when the system is to be utilized, the power is turned on as shown in block 100. This results in a command from the microprocessor shown in block 102 to blank the display, that is, blank the LED displays 40–44 shown in FIG. 1B. As shown in block 104, a five second delay ensues to eliminate spurious signals associated with start-up.

As shown at block 106, the next step is to initialize the various ports in the microprocessor and the I/O expander and this step is followed by a command 108 to close all system valves, that is, to close the inflate valve 20 and the bleed valve 22.

At this juncture, the pressure within the tire is read by the transducer 24 as shown in block 110. This sampling of tire pressure will yield the pressure indication corresponding to the initial pressure in the tire. At subsequent points in the procedure, the same sampling procedure will yield current pressure information.

The system then questions whether the overpressure switch 26 has been closed due to an overpressure within the tire. This decision is shown at block 112 and if it is determined that an overpressure condition exists, a loop is followed wherein the bleed valve 22 is opened as shown in block 114 and the LED display is intermittedly operated as shown at block 116 to display whatever pressure was read at block 110. The loop is continually followed until such time as the overpressure switch 26 opens indicating that the overpressure condition has been relieved. Once such has occurred, all valves are again closed as shown at block 118 and the then existent pressure within the tire is read and displayed on the LED display as shown in block 120.

The system then questions whether or not it has received a start command from the start switch 34 as shown at block 122. If no such command has been received, the program executes a loop back to block 106 and continues to repeat the loop until a start command is received. When the start command has been issued, the first program step is to reset and enable the interupt circuit for the stop switch 36 as shown in block 124. This is followed by a reading of the thumbwheel switches 28–32 to obtain the desired final pressure in the tire. This step is shown in block 126. The current pressure in the tire is then read as shown at block 128.

The program proceeds to interrogate the bead seat switch 38 to determine whether the system is in the "bead-seat" mode. This interrogation is shown in block 130 and if the system is conditioned for the bead-seat mode, the next step, shown in block 132, is to display the current pressure on the LED displays 40–44. An arbitrary final pressure of 40 psig is then set as shown in block 134. This pressure level is empirically determined as it has been found that an internal pressure of 40 pounds per square inch is sufficient to drive unseated beads in any tire and wheel combination to the rim flanges of the wheel to thereby seat the beads.

The next step is to select which valve is to be opened. This is shown in block 136 and if the pressure then existing within the tire is in excess of 40 psig, the bleed valve 22 will be selected while if the tire pressure is less than 40 psig, the inflate valve 20 will be selected.

The program then proceeds to a so-called "flate" routine shown in block 138 and detailed in FIG. 3. As will be seen, this will result in the controlling of the internal pressure within the tire to 40 psig to insure that the beads are seated.

Once this has occurred, the system then proceeds to adjust the internal pressure to the desired pressure. Accordingly, the desired final pressure is then read from the thumbwheel switches 28–32 as shown in block 140 and the program proceeds to select which of the valves should be opened to achieve the desired pressure level as shown in block 142.

Returning to the bead-seat mode interrogation shown in block 130, if such interrogation determines that the system is not in the bead-seat mode, the program proceeds to a decision shown in block 144 whereat the determination of whether the current pressure is equal to the desired final pressure is made. If the two are equal, the program returns to the initialize block 106. If not, the program proceeds to the block 142 for valve selection purposes.

After the appropriate valve has been selected, the flate routine is executed as shown at block 145. The flate routine may or may not include an execution of the finish routine shown in FIG. 5 and will be described in greater detail hereinafter. In any event, once the flate routine and/or the finish routine are executed, as will be seen, the desired final pressure in the tire will be achieved and the chime 46 will be sounded as shown at block 146. A two second delay ensues as shown at block 148 and then the program proceeds to execute the finish routine shown in FIG. 5 as designated by block 150. Once the finish routine is executed, a decision is made at block 152 to determine whether the current pressure as sensed at the transducer 24 is equal to zero psig. If so, the system perceives this as an indication that the conduit end 16 has been disconnected from the tire (thereby allowing any pressurized gas in the conduit 10 to vent to the atmosphere through the end 16) and the program returns to the initialize block 106.

If the current pressure is not equal to zero, the system perceives that it is still connected to the tire and a loop is executed to return to the block 146 and again sound the chime. This loop, including the execution of the finish routine will be repetitively performed until such time as the current pressure is read as zero indicating system disconnection and serves the following purpose. In the typical case, the connection of the conduit end 16 to a tire via an air chuck or the like will not be leakage free. Thus, even though the desired tire pressure will have been achieved at the conclusion of the execution of the flate routine as shown in block 145, there is the possibility that it will decrease somewhat due to such leakage. By continually executing the loop just described until the system is disconnected from the tire, assurance that the desired pressure level will be maintained within the tire is attained in spite of such leakage.

Should the stop switch 36 be closed at any time during the foregoing process, the program will revert to block 106 as a result of the stop command shown in block 154. The same will be true if the overpressure switch 26 closes during the process as shown at block 156. In either event, it will be observed that so long as either a stop signal or an overpressure condition exists, there can be no inflation of the tire, but only venting, and then, only in the case of an overpressure condition.

Turning now to FIG. 3, the flate routine will now be described in detail. The same is termed "flate" in that it is capable of causing either inflation or deflation of a tire to the desired pressure level.

Once the flate routine is initiated, the first step requires the reading and storing of the initial pressure within the tire as shown in block 160. This is accomplished by closing both of the valves 20 and 22 at the initiation of the flate routine and determining the then existent pressure within the tire by the transducer 24.

Inquiry is then made as to whether the system is in the bead seat mode as shown at block 162. If not, a determination is made as shown at block 164 as to whether the initial pressure is within 10 psig of the desired final pressure. If it is not, the system takes this determination as an indication that a substantial inflation or deflation operation must be performed and returns to a block 166. At block 166, there is set a one second time as a control parameter and the system proceeds to execute the energize routine shown in FIG. 4.

Conversely, if the initial pressure is within 10 psig of the final pressure, the program, from block 164, proceeds to block 168 to bypass the block 166. The block 168 is similar to the block 166 except that the set time is one-half of a second rather than one second.

In either event, the energize routine proceeds for a time period as will be explained and at the conclusion thereof, the program proceeds to a block 170 which reads and displays the current pressure in the tire by means of the transducer 24 after the valves 20 and 22 have been closed.

From block 170, the program proceeds to block 172 for the purpose of determining whether the current pressure is equal to zero. This determination is made to determine whether the conduit end 16 is still connected to the tire, a zero pressure determination being an indication that disconnection, either intentional or inadvertant, has occurred.

If the current pressure is equal to zero, the program returns to its leave off point in the main program. If the current pressure is other than zero, a determination is made at the next stage of the program, block 174, as to whether the change in pressure from initial to current exceeds 20%. If so, the program splits to a block 176 which makes the determination that a small tire such as a bicycle tire is being inflated and from the block 176 proceeds to execute the finish routine shown in FIG. 5 and designated in FIG. 3 as block 178.

Figure 4:
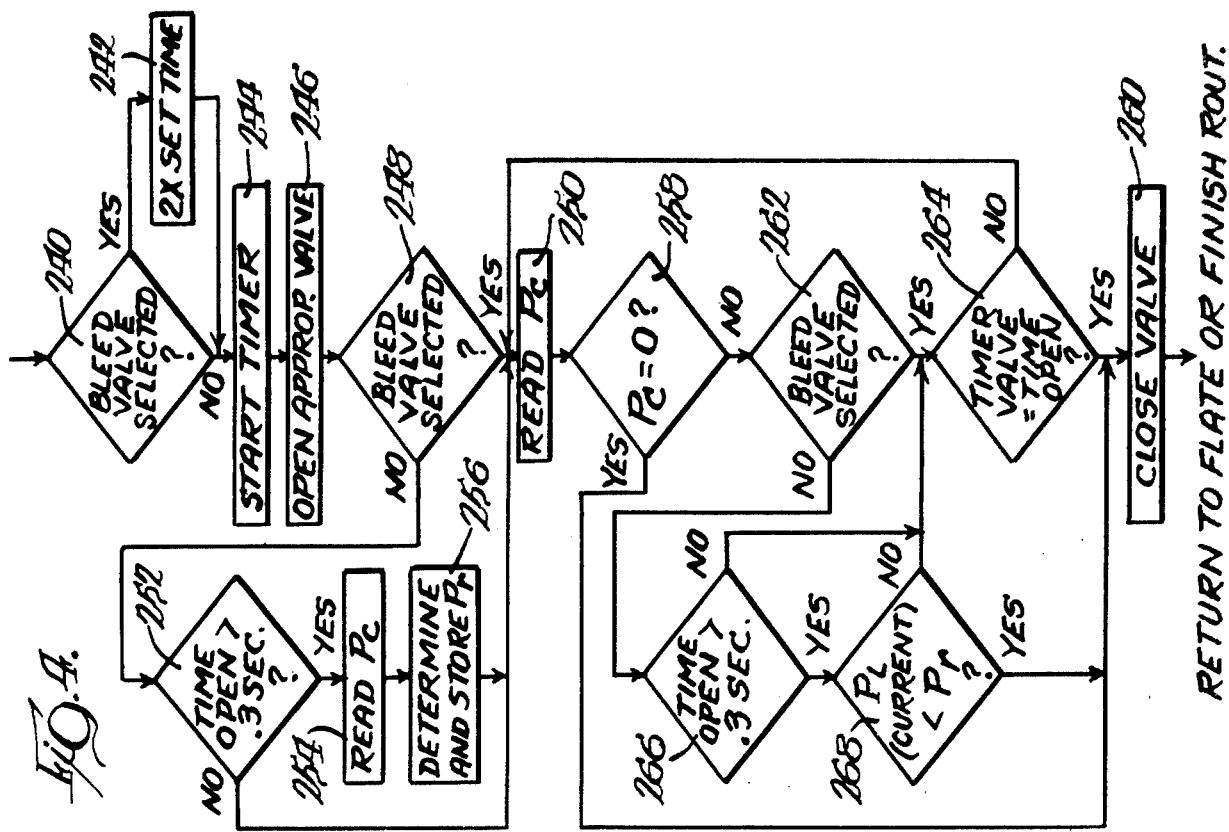
FIG. 4 is a flow diagram of an "energize" sub-routine of the main program.

Conversely, if the change in pressure does not exceed 20%, the program proceeds to block 180 which sets a five second time for use in the energize routine and proceeds with the energize routine as shown in FIG. 4.

After the energize routine has been concluded, the program, at block 182, calls for a reading and a display of the then current pressure. If the current pressure is zero, again indicating disconnection, at block 183, the program branches to return to the main program. If the pressure is not zero, at block 184, a determination is made as to whether the change in pressure exceeds 40% of that desired. If the answer is yes, the program proceeds to an initial calculation shown at block 186. If not, the program branches to a block 188 and a block 190 which repeat the steps of blocks 180 and 182.

Following the block 190, at block 192, a determination is again made as to whether the current pressure is equal to zero to determine whether there has been a disconnection from the tire. If so, there is a return to the main program and if not, there is a return to the block 186.

The purpose of the program and the determinations mentioned immediately preceding is to assure that the inflation or deflation process has proceeded sufficiently so as to allow the use of the relation set forth in Equation 1 above in calculation modes.

At block 186, calculation proceeds to determine the time required to fill the tire according to Equation 1. It should be noted that the 0.9 multiplier used in Equation 1 is employed to insure that the calculated time will not exceed the actual time required in practice to achieve the desired inflation level.

From the block 186, the program proceeds to a block 194 which sets a time equal to one-half of that calculated and causes the energize routine to be executed. Upon conclusion of the energize routine, the current pressure is read and displayed at block 196 and that is followed by a determination at block 198 as to whether the current pressure is equal to zero, again for determining whether disconnection has been made. Again, if yes, there is a return to the main program whereas, if no, the program proceeds to a block 200 which calls for recalculating the time required to complete inflation of the tire according to the relationship employed in Equation 1. From there, the program proceeds to block 202 which sets the time calculated and executes the energize routine.

It should be noted that the purpose at block 194 of setting only one-half the time calculated versus the setting of the full time calculated at block 202 is to assure that the actual time required to attain the desired pressure level is not exceeded at the stage of the program represented by the block 194 when the inflation or deflation process will normally be further from being complete than at the time at which block 202 occurs in the process.

Following the execution of the energize routine at block 202, the current pressure is again read and displayed at block 204 and a determination then made at block 206 as to whether the current pressure is equal to zero, again indicating a disconnection of the system from the tire. If yes, there is again a return to the main program while if not, the program proceeds to block 178 to cause execution of the finish routine. Once the finish routine is executed and completed, there will be a return to the main program as indicated in both FIGS. 3 and 5.

Figure 5:
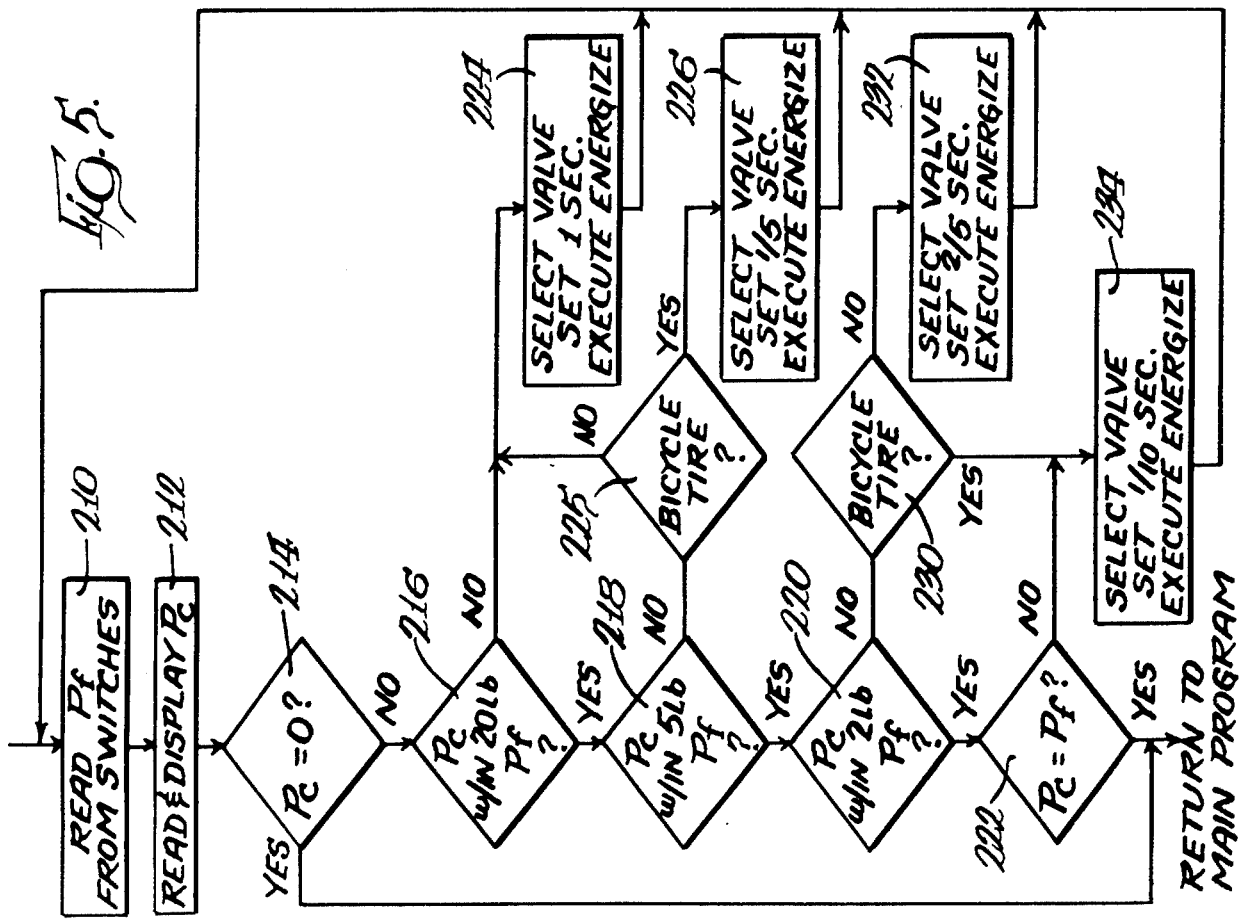
FIG. 5 is a flow chart of a "finish" sub-routine of the main program.

While achievement of a desired pressure level can occur during the flate routine shown in FIG. 3, no determination of such is made without proceeding to the finish routine. This is due to the fact that the flate routine of FIG. 3 provides a somewhat coarse inflation or deflation process whereas the finish routine performs such processes with exactness. The finish routine is illustrated in FIG. 5 and in addition to being always performed at the conclusion of the flate routine unless there is an earlier return to the main program due to system disconnection, can be performed independently as a step in the main program as shown at block 150 of FIG. 2 for the purposes mentioned previously. The first step of the finish routine is to read the thumbwheel switches 28, 30 and 32 as shown at block 210. This is followed by the step of reading and displaying the current pressure as shown in block 212. If the current pressure is equal to zero as determined by a step indicated in block 214, the routine returns to the main program again, for the purposes of indicating system disconnection.

If the current pressure is not equal to zero, the routine proceeds to a block 216 whereat a determination is made as to whether the current pressure is within twenty psig of the desired final pressure. If yes, the routine proceeds to block 218 whereat a determination as to whether the current pressure is within five psig of the desired final pressure is made. Again, if the answer is yes, the routine proceeds to the block 220 to determine whether the current pressure is within two psig of the desired final pressure. If this determination is yes, the routine proceeds to a block 222 which determines whether the current pressure is equal to the final pressure. If the answer to this determination is yes, there is a return to the main program with the result that the chime 46 will ultimately be sounded to indicate the conclusion of the process.

Returning to the block 216, if the current pressure is not within 20 psig of the final pressure, the program splits to a block 224 which sets up a one second time period and causes execution of the energize routine. At the conclusion of that step, the program loops back to the block 210.

If the program has proceeded past block 216 to the block 218, and the current pressure is not within five psig of the final pressure, inquiry is made as to whether a small tire such as a bicycle tire is connected to the system at block 225, the determination having been previously made at block 176, in the flate routine.

If the answer is no, the step shown in block 224 is performed. If a small tire is being inflated, the program branches to a block 226 which sets a time of one fifth of a second and executes the energize routine after which the program loops back to the block 210.

If the routine has proceeded to block 220 and a determination is there made that the current pressure is not within two psig of the final pressure, the program branches to a block 230 again to question whether a small tire is being inflated. In this case, if the answer is no, the program proceeds to a block 232 which sets time of two fifths of a second and executes the energize routine. Upon conclusion of the energize routine, the system then loops back to the block 210. Conversely, if a small tire is being inflated, at block 230 the program branches to a block 234 which sets a time of one tenth of a second and executes the energize routine after which there is a return to the block 210.

If the routine has proceeded through block 220 meaning that the current pressure is within two psig of the final pressure but, at block 222, determines that the two are not equal, the routine branches to the block 234 which sets a one tenth of a second time and executes the energize routine following which there is a return to the block 210.

Because the finish routine returns to its start whenever current pressure does not equal the final pressure, regardless of where such determination is made, it will be repetitively performed until the current pressure does equal the final pressure.

The energize routine shown in FIG. 4 provides the actual control over the inflate valve 20 or the bleed valve 22. It utilizes, during its performance, the various times that are indicated as "set" at various stages of the flate and finish routines. However, only in the case of an inflation process is the time indicated actually used. In the case of a deflation process, the time indicated multiplied by two is utilized. This is due to the fact that the pressure differential from the source to the pressure in the tire during an inflation process will be far greater in virtually every instance than the pressure differential between the pressure in the tire and the desired final pressure during a deflation process. Consequently, because of the lesser pressure differential existing in the usual case during a deflation process, gas flow from the tire will not be as rapid and more time will be required to effect a further change in the pressure of the tire.

Thus, the first step in the energize routine, shown at block 240, is to determine whether the bleed valve has been selected, which determination is made in either block 136 or block 142 of the main program or blocks 224, 226, 232 or 234 of the finish routine. If so, at block 242, a control parameter equal to two times the set time is introduced. If not, the set time indicated is utilized and at block 244, a timer is started to open the appropriate one of the valves 20 and 22 as shown at block 246. Following block 246, the system is then interrogated again as to whether the bleed valve has been selected as shown at block 248. If yes, the program proceeds to a block 250 for the purpose of reading the line pressure. The pressure, in this sequence, is read via the transducer 24 with the bleed valve 22 open. Consequently, a pressure level will be sensed that will be slightly higher than atmospheric pressure unless the conduit end 16 has been disconnected from the tire in which case, atmospheric pressure will be sensed.

At block 248 the routine may branch in the event that the bleed valve 22 has not been selected. First, a determination is made at block 252 as to whether the set time for which the valve is to be opened is greater than 3/10 of a second. If the answers is no, the routine returns to block 250 and the current pressure will be read with the inflate valve 20 open. If the answer is yes, the line pressure is read at block 254, again with the inflate valve 20 open and that is followed, at block 256, by a determination of the reference pressure along with the storage of the same. When pressure is sensed with the inflate valve 20 open, the pressure determined will be very nearly equal to that of the source 14 less any flow losses between the transducer 24 and the source 14 as the largest restriction typically found in the system will be that presented by the valve stem which will result in a creation of a substantial back pressure in the conduit 10. Of course, if the conduit has become disconnected from the tire, a pressure near atmospheric will be sensed.

In any event, as previously mentioned, the reference pressure determined at block 256 is selected to equal 31/32 of the line pressure and from that determination, the program returns to the block 250.

Proceeding from the block 250, at block 258 a determination is made as to whether the current pressure is equal to zero, again for the purpose of determining whether the system has been disconnected from a tire. If so, the program branches to a block 260 to cause closing of the valve 20 to prevent wastage of compressed gas from the source 14.

If the current pressure is not equal to zero, the program proceeds to a block 262 which again questions whether the bleed valve has been selected. If so, the routine continues to a block 264 to determine whether the value in the timer, started at block 244, is equal to the time the particular valve involved is to be opened, that is, the set time in the case of the inflate valve 20 or twice the set time in the case of the bleed valve 22. If the answer is no, the program loops to return to the block 250 while if the answer is yes, the selected valve is closed at block 260.

In the event it is determined at block 262 that the bleed valve is not selected, the program branches to a block 266 which again questions whether the time that the valve is to be opened is greater than three tenths of a second. If the answer is no, the routine returns to the block 264 for the purpose mentioned previously. If the answer is yes, the routine proceeds to a block 268 whereat the determination is made as to whether the current line pressure is less than the reference pressure determined at block 256. If yes, the valves are closed at block 260 and the routine returns to either the flate or finish routine at the point therein whereat such routines left off. Conversely, if the current line pressure is greater than the reference pressure, at block 268, the routine returns to the block 264.

Because of the loop from the block 264 back to the block 250, it will be appreciated that, assuming the routine is not otherwise aborted, the appropriate valve will be opened until the value in the timer is equal to the time that the particular valve is scheduled to be opened.

It should be observed that the determination made at block 268 allows the routine to be abruptly aborted in the event, for some reason, the line pressure falls below the reference pressure. The determinations made in blocks 252 and 266 are for the purpose of bypassing this abort mode in the event that the scheduled time for the valve to be open is less than 3/10 of a second, in which case there is insufficient time for the mechanical parts of the system to be appropriately controlled.

It should be observed that the set times given in absolute terms have been empirically determined so as to provide the system with almost universal capability of controlling pressure levels in tires ranging from very small volume tires such as bicycle tires to extremely high volume tires operated at high pressures such as truck tires or even larger tires. Of course, in the case of small tires, desired pressure levels can be rapidly obtained hence the flate routine immediately branches to the finish routine when a determination that a small tire is connected to the system is made as the set times involved in the finish routine are small compared to those utilized at various points in the flate routine and are all that are required to rapidly inflate a small tire. Conversely, the large times employed in the flate routine insure that a tire other than a small tire will have its internal pressure brought rapidly to a point somewhat closer to the desired pressurization level. Accurate completion of the process is then accomplished by turning to the finish routine.

In every case, however, the full pressure available at the source 14 (less minor flow losses occurring in the conduit 10) is applied to the tire. This maximizes the pressure differential available throughout an inflation cycle to insure that the desired pressure level will be achieved as rapidly as source pressure will permit. In effect, the system provides digital control of the valves 20 and 22 as they are either opened or closed, thereby allowing unrestricted gas flow or halt it altogether. There is never a metering or throttling function performed by the valves 20 and 22 which would reduce the pressure differential involved.

It is estimated that use of the system requires only about $\frac{1}{2}$ of the time to reach a desired inflation pressure of a typical 28–32 psig for an automobile tire and about $\frac{1}{2}$ of the time in inflating a large truck tire to a typical pressure in the range of 85–105 psig of the time required by prior art pressure regulator systems. Even these substantial time savings can be increased, particularly in the case of truck tires, where source pressure greater than the typical 150 psig is available at the servicing facility.

Similarly, some time saving is achieved over the manual method of inflating tires. There is no need to manually check tire pressure at various points in an inflation or deflation cycle, either with or without disconnection of the pressure source to make such determination. Moreover, the invention eliminates under and over inflation errors in the manual method due to human error during inflation or deflation processes.

The bead-seat mode provided by the invention is a distinct advantage at tire servicing facilities that change tires in that each tire changed, or even removed from a wheel for servicing, must have its beads seated on the wheel before the wheel can be replaced on a vehicle. The bead-seat mode of the present invention not only insures that the beads are seated, but after that has been accomplished, automatically proceeds to set the desired pressure level within the tire without any intervention by an operator.

The invention also automatically compensates for any leakage present at the connection between the conduit end 16 and the tire by repetitively re-executing the finish routine as required so long as the conduit 10 is connected to the tire even though the operator may neglect to make the disconnection for a sizable time period.

Rapidity of the inflation or deflation process performed by the invention is maximized in that part of the system that calculates, based on parameters existing within the system, the time required to complete a process to thereby minimize the time spent in sampling tire pressure which of course requires closure of the valves 20 and 22 with the consequence that no inflation or deflation can occur during such sampling.

It will be observed that such calculations are based on a relationship that is essentially independent of variables such as source pressure and the size and nature of the restriction to gas flow posed by a valve stem and/or valve core within the valve stem. These variables are, of course, taken into account as inherently affecting the change in pressure during a process over a given period of time but they need not be physically measured or otherwise determined on an individual basis for use in the calculation.

Finally, it will be appreciated that the invention can operate as a simple pressure gauge with a digital readout. If connected to a tire, but no start command as shown in block 122 in FIG. 2 is received, the instruction at block 120 to read and display the current pressure within the tire will result in the system providing a digital pressure indication of the pressure within the tire as though it were a simple pressure gauge.

Reference may be additionally had to the attached Appendix A which is a statement of the program utilized in the invention in machine language appropriate to the components specifically identified in FIG. 1.

We claim:

1. Apparatus for rapidly achieving a desired pressure level in a tire by gas flow through a port in the tire such as a valve stem comprising:
    a conduit having one end for connection to a source of gas under pressure and another end for connection to the inflation port of a tire, the path between said conduit and the inflation port being susceptable to leakage;
    a valve means for selectively (a) closing and opening said conduit and (b) for venting said conduit to the atmosphere;
    means for selecting a desired pressure level less than the pressure level of said source;
    pressure level sensing means connected to said conduit; and
    control means responsive to said sensing means and to said selecting means for digitally operating said valve means to apply gas under pressure substantially at the pressure level of said source to the tire port throughout an inflation cycle, for relieving pressure in the tire at a level in excess of said desired pressure level and for closing said conduit when said desired pressure level is attained, said control means further including means for detecting leakage in said path after said desired pressure level is attained and in response thereto, digitally operating said valve means to maintain the pressure level at said desired pressure level notwithstanding such leakage.

2. Apparatus for rapidly achieving a desired pressure level in a tire by gas flow through a port in the tire such as a valve stem comprising:
    a conduit having one end for connection to a source of gas under pressure and another end for connection to the inflation port of a tire;
    a valve means for selectively (a) closing and opening said conduit and (b) for venting said conduit to the atmosphere;
    means for selecting a desired pressure level less than the pressure level of said source;
    pressure level sensing means connected to said conduit;
    control means responsive to said sensing means and to said selecting means for digitally operating said valve means to apply gas under pressure substantially at the pressure level of said source to the tire port throughout an inflation cycle, and for relieving pressure in the tire at a level in excess of said desired pressure level; and
    additional selecting means for selecting a bead seat mode when a tire to be connected to said conduit another end requires that its beads be seated on a wheel on which it is mounted,
    said control means being further responsive to said additional selecting means when a bead seat mode is selected to first operate said valves to achieve a pressure level within the tire of sufficiently high magnitude to seat the tire bead and then operate said valves to achieve said desired pressure level within the tire.

3. Apparatus for rapidly achieving a desired pressure level in a tire by gas flow through a port in the tire such as a valve stem comprising:
    a conduit having one end for connection to a source of gas under pressure and another end for connection to the inflation port of a tire;
    a valve means for selectively (a) closing and opening said conduit and (b) for venting said conduit to the atmosphere;
    means for selecting a desired pressure level less than the pressure level of said source;
    pressure level sensing means connected to said conduit; and
    control means responsive to said sensing means and to said selecting means for digitally operating said valve means to apply gas under pressure substantially at the pressure level of said source to the tire port throughout an inflation cycle, and for relieving pressure in the tire at a level in excess of said desired pressure level, said control means being operable in a coarse mode and fine mode, and including means operable during at least said coarse mode for calculating variable time periods for which said valve means should be operated in response to pressure level changes sensed by said pressure level sensing means at differing times in an inflation cycle.

4. Apparatus for rapidly achieving a desired pressure level in a tire by gas flow through a port in the tire such as a valve stem comprising:
 a conduit having one end for connection to a source of gas under pressure and another end for connection to the inflation port of a tire;
 gas control means for controlling gas flow through said conduit;
 first means for selecting a desired pressure level less than the pressure level of said source;
 second means for selecting a bead seat mode when a tire to be connected to said conduit another end requires that its beads be seated on a wheel on which it is mounted;
 pressure level sensing means connected to said conduit; and
 means responsive to said sensing means and to both said selecting means for operating said gas control means to apply gas to the tire port to first achieve a pressure level within the tire sufficient to seat the beads thereof and then achieve said desired pressure level within the tire.

5. The apparatus of claim 4 wherein said gas control means comprises at least one valve and said operating means digitally operates said valve.

6. Apparatus for rapidly achieving a desired pressure level in a tire by gas flow through a port in the tire such as a valve stem comprising:
 a conduit having one end for connection to a source of gas under pressure and another end for connection to the inflation port of a tire;
 a valve for selectively closing and opening said conduit;
 means for selecting a desired pressure level less than the pressure level of said source;
 pressure level sensing means connected to said conduit; and
 control means responsive to said sensing means and to said selecting means for digitally and sequentially opening and closing said valve for predetermined time periods to apply gas under pressure substantially at the pressure level of said source to the tire port throughout an inflation cycle until said desired pressure level is achieved, said control means being operable to provide a coarse inflation mode followed by a fine inflation mode and further including means for determining whether a tire to be inflated is a relatively small tire and for causing said control means to skip said coarse inflation mode.

* * * * *